United States Patent [19]
Goetter

[11] Patent Number: 4,799,757
[45] Date of Patent: Jan. 24, 1989

[54] ENCAPSULATED FIBER OPTIC CLOSURE

[75] Inventor: Erwin H. Goetter, Chesterland, Ohio

[73] Assignee: Preformed Line Products Company, Cleveland, Ohio

[21] Appl. No.: 40,926

[22] Filed: Apr. 21, 1987

[51] Int. Cl.⁴ .............................................. G02B 6/36
[52] U.S. Cl. ................................ 350/96.20; 350/96.21
[58] Field of Search ............... 350/96.15, 96.20, 96.21, 350/96.22, 96.23; 174/92, 91, 87

[56] References Cited

U.S. PATENT DOCUMENTS

| | | | |
|---|---|---|---|
| 2,771,502 | 11/1956 | King et al. | 174/92 |
| 3,992,569 | 11/1976 | Hankins et al. | 174/92 |
| 4,039,742 | 8/1977 | Smith | 174/87 |
| 4,203,000 | 5/1980 | Muller | 174/92 |
| 4,319,951 | 3/1982 | Korbelak et al. | 350/96.21 X |
| 4,332,435 | 6/1982 | Post | 350/96.2 |
| 4,359,262 | 11/1982 | Dolan | 350/96.22 X |
| 4,423,918 | 1/1984 | Filreis et al. | 339/97 P |
| 4,424,412 | 1/1984 | Goetter et al. | 174/92 |
| 4,428,645 | 1/1984 | Korbelak et al. | 350/96.2 |
| 4,549,040 | 10/1985 | Goetter | 174/92 |
| 4,558,174 | 12/1985 | Massey | 174/92 |
| 4,657,346 | 4/1987 | Berry et al. | 350/96.2 X |
| 4,733,935 | 3/1988 | Gandy | 350/96.21 |

FOREIGN PATENT DOCUMENTS 2579330  9/1986  France ........................ 350/96.21

Primary Examiner—John D. Lee
Attorney, Agent, or Firm—Fay, Sharpe, Beall, Fagan, Minnich & McKee

[57] ABSTRACT

A closure assembly for encapsulating a fiber optic cable. A pair of opposed end plates cooperate with respective adaptor collars to receive an organizer tray therebetween defining a first cavity. A resin cup is positioned adjacent at least one end plate to receive the fiber optic cable as it extends inwardly into the first cavity. A first resin is retained in the resin cup and encapsulates the fiber optic cable therein. An inner shell assembly is thereafter positioned around the organizer tray to close off the first cavity. An outer shell assembly is next positioned around the inner shell and the end plates to define an annular second cavity. A reenterable resin fills the second cavity to prevent radial ingress of moisture into the cavity.

16 Claims, 4 Drawing Sheets

ENCAPSULATED FIBER OPTIC CLOSURE

BACKGROUND OF THE INVENTION

This invention pertains to the art of cable closure assemblies and more particularly to a closure assembly which encloses a fiber optic cable splice or the like and prevents the ingress of moisture.

The invention is particularly applicable to an encapsulated fiber optic closure assembly, and a method of encapsulating a fiber optic cable, and will be described with particular reference thereto. However, it will be appreciated that the invention has broader implications and may be advantageously employed in other closure assembly ennvironments and applications.

Use of closure assemblies for splice cases, cable vaults, and other eletrical cable terminus receiving containers are well known in the art. Although some of these prior constructions are suitable for the recent advent and changeover to fiber optic technology, certain other parameters and qualitative requirements must be met to fully incorporate all aspects of the fiber optic technology. The fragile nature of the individual optical fibers requires special handling and care to prevent any damage, undue compression, or breakage. Further, the splice area must be kept clean and free of moisture so that the transmissibility through the cable remains unaffected and any alteration of the signal carrying capabilities of the cable is minimized.

Prior arrangements utilized by others have simply field constructed or custom-made an individual unit around a fiber optic cable tray organizer. Although these closure assemblies have met with some or limited success, this piecemeal approach for a construction that is being encountered more and more frequently requires vast improvement. In fact, the prior arrangements can only be considered as meeting the minimum criteria for simplicity, reliability, and repeatability.

Further, the custom-made closure assemblies still have problems associated with moisture ingress into the interior cavity which receives the spliced cables. Previous designs have utilized air pressure or other gaseous pressure in an effort to limit the ingress of moisture. It has been considered desirable to add an additional or further blanket of protection to the cable splice area.

Although other non-optical fiber cable closure assemblies have adequately incorporated resin type seal arrangements into their structures in an effort to alleviate the moisture ingress problem, these structures have completely encapsulated the cable splice connections, i.e., completely filled the central cavity with the resin material. As referenced above, the fiber optic cables require special treatment and the applicability of these resinous arrangements remains in doubt due to the generally held view that use of resin is incompatible with the fiber optic cable splice technology.

The present invention is deemed to meet the foregoing needs and others in a manner that provides an extra protective layer through limited use of resin. Simultaneously, the closure assembly is so constructed that the exposed optical fibers in the splice cavity remain free and unaffected by use of the resin.

SUMMARY OF THE INVENTION

The present invention contemplates a new and improved apparatus and method of encapsulating a fiber optic splice arrangement.

According to one aspect of the invention, the closure assembly includes first and second spaced end plates adapted to receive an associated cable into a first cavity defined therebetween. A cover comprising a first set of cooperating shells extends between the end plates in enclosing relation with the first cavity. Means for retaining a limited amount of encapsulant material adjacent the end plate receiving the associated cable prevents further moisture ingress to the first cavity.

According to another aspect of the invention, the retaining means includes a resin cup having a first open end that abuttingly engages the associated end plate. The resin cup includes an aperture at its second end that closely receives the associated cable as it extends inwardly into the cavity.

According to a further aspect of the invention, first and second adaptor collars engage respective end plates. The adaptor collars each include a peripheral portion for receiving the cover and closing the first cavity.

In accordance with yet another aspect of the invention, a first resin is received in the resin cup to limit axial moisture ingress.

In accordance with a still further aspect of the invention, a second set of cooperating shells are concentrically arranged around the cover or first shells to define an annular second cavity therebetween. A reenterable second resin is supplied to the annular cavity to limit radial moisture ingress.

According to another aspect of the invention, a method of limiting ingress of moisture to the first cavity is provided.

A principal advantage of the invention resides in a simple, reliable manner for encapsulating a fiber optic cable splice arrangement.

Yet another advantage of the invention is found in limited use of resin to prevent both axial and radial ingress of moisture.

Still another advantage of the invention is realized in the adaptability of the closure assembly to existing end plate arrangements.

Yet another advantage of the invention resides in the adaptability of the resin sealing structure to either a butt splice or in-line splice.

Still other advantages and benefits of the invention will become apparent to those skilled in the art upon a reading and understanding of the following detailed description.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
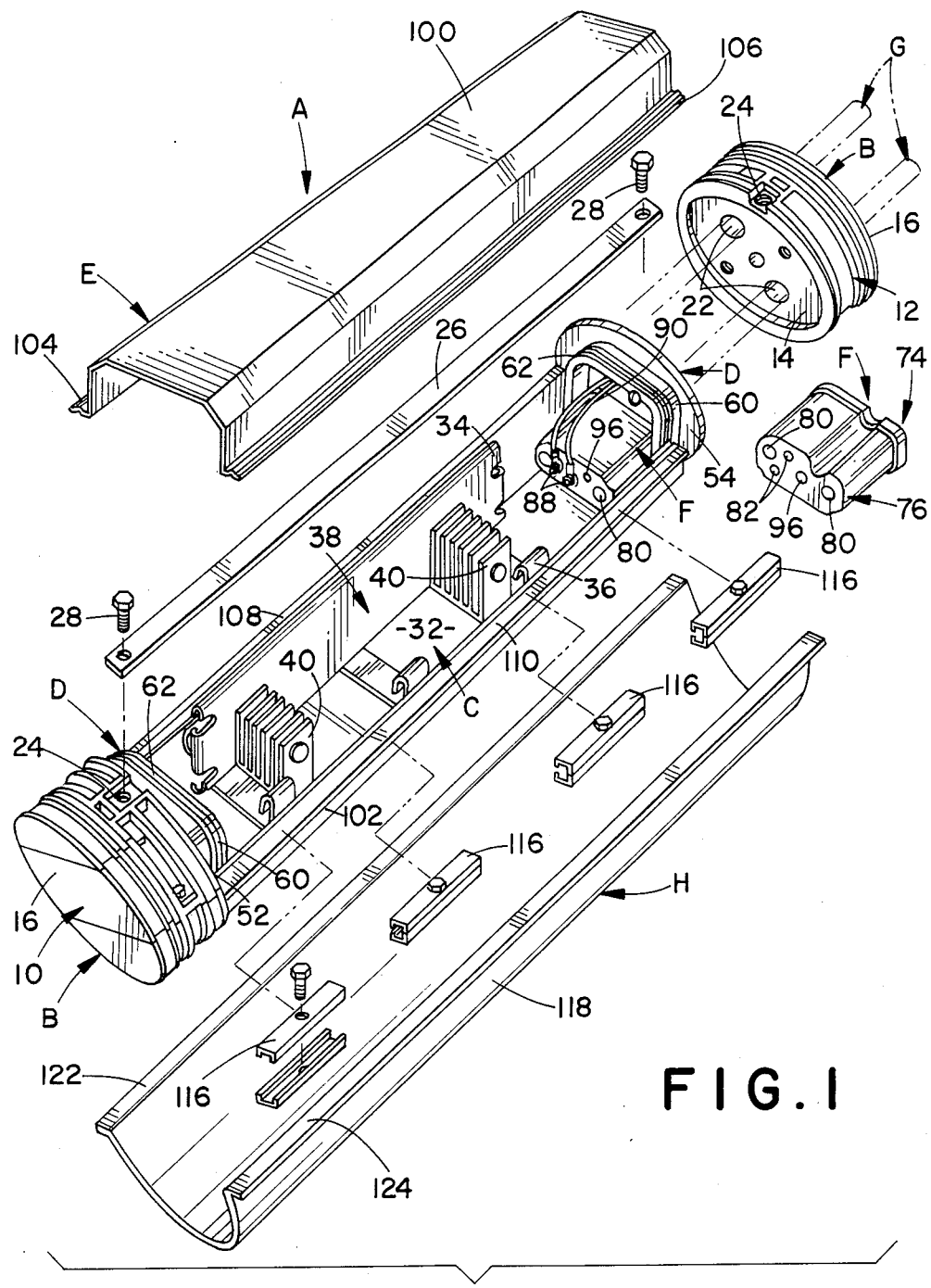
FIG. 1 is an exploded perspective view of a closure assembly formed according to the subject invention.

Referring now to the drawings wherein the showings are for purposes of illustrating the preferred embodiment of the invention only and not for purposes of limiting same, the FIGURES show a closure assembly A having an end closure structure B axially separated by a tray organizer C. An adapter collar arrangement D extends from the inner faces of the end plates and, in turn, receives an inner cover or shell assembly E thereon. A resin cup F is adapted to receive a cable G, such as a fiber optic cable, that is prepared for splicing in the closure assembly. An outer shell assembly H provides an extra layer of protection to the closure assembly.

More specifically, the end closure structure B includes first and second opposed end plates 10, 12 in axially spaced relation. Each end plate, in turn, has an inner face 14 and an outer face 16. As illustrated in the preferred embodiment of FIG. 1, the first end plate 10 has a generally solid, circular conformation. The second end plate 12 is of like construction and includes means 22 for receiving the cable G therethrough. The receiving means 22 comprises any number of apertures 25 adapted to closely receive a fiber optic cable G. Although both end plates and the overall closure assembly A are illustrated as having generally arcuate peripheries, it is apparent that other shapes and conformations can be utilized without departing from the scope and intent of the subject invention. The end plates further include means 24 for securing one or more torque bars 26 between the end plates. Conventional fasteners such as screws 28 secure opposed ends of torque bar 26 to each end plate. The torque bar provides further rigidity and limits relative rotational movement between the end plates.

As briefly described above, the first end plate 10 is generally solid so that the entire closure assembly defines what is commonly referred to as a butt splice, i.e., where the cables are received through only one end plate. As will be recognized by those skilled in the art, the first end plate may also be provided with receiving means 22 so that fiber optic cables may be received through both end plates. Such an arrangement is typically referred to as an in-line splice.

The tray organizer C is an elongated structure having a generally planar bottom portion 32, and first and second side walls 34, 36, respectively, which define a central first cavity 38. A plurality of vertically arranged elements 40 (FIG. 1) facilitate alignment for connection and splicing purposes between the optical fibers. The tray organizer could, alternately, include horizontally arranged elements (not shown) or employ an outwardly extending threaded member such as stud 42 (FIG. 2) cooperating with vertical spacers 44 for supporting a curvilinear support flange 46 to facilitate organization of the optical fibers. The support flange assists in separating and supporting the various optical fibers preparing for splicing. Further detailed discussion and description of the tray organizer assembly is deemed unnecessary to a full and complete understanding of the subject invention.

Figure 4:
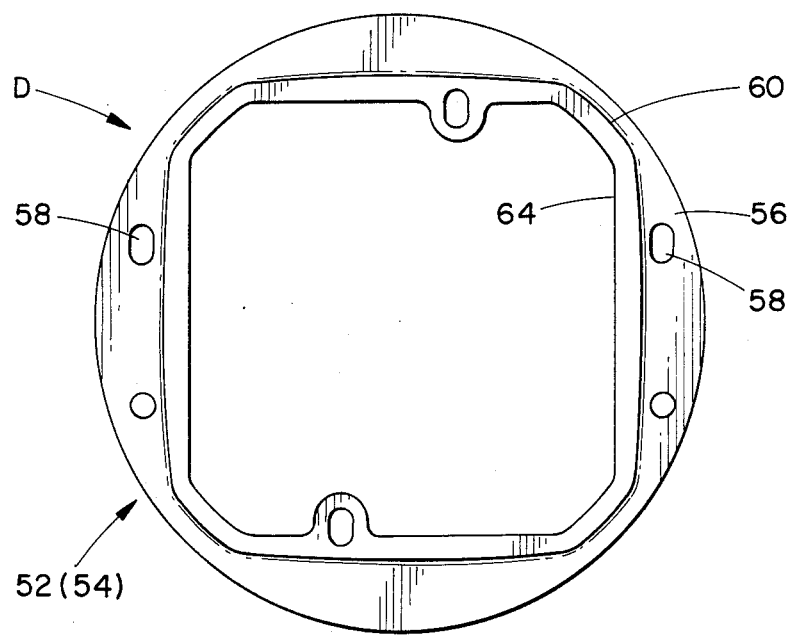
FIG. 4 is a plan view of an adaptor collar utilized in the subject invention; and, FIG. 5 is a side elevational view of a partially assembled closure assembly particularly showing the positioning of outer shells thereon.

The adaptor collar arrangement D includes first and second adaptor collars 52, 54, respectively. With continued reference to FIGS. 1 and 2, and additionally with reference to FIG. 4, it is apparent that each adaptor collar includes a generally circular peripheral rim portion 56 adapted for cooperative abutting engagement with the inner face 14 of an associated end plate. Plural elongated apertures 58 provide some play for associated fasteners received therein to accommodate orientation of an adaptor collar to different sized end plates. For example, the end plates are typically constructed from cooperating half sections or, possibly, three sections. A seal is formed between the cooperating seams defined between the end plate sections through use of a sturdy, double rubber tape. The tape creates a gasket-like seal that keeps air in and moisture out, even at different temperatures. Depending on the thickness of the resulting seams some latitude in the diameter of the end plates is accommodated by the elongated apertures.

Each adaptor collar further includes an axially extending raised flange 60 having a reduced peripheral dimension relative to the diameter of rim portion 56. The irregular periphery of the flange defines a ridged mounting surface 62 that sealingly receives the inner shell assembly E as will become more apparent hereinbelow. The central portion of each adaptor collar defines an enlarged opening 64 adapted to freely receive buffer tubes extending axially inward from the associated end plate.

As the term is used in the art, a fiber optic cable refers to an assembled cable generally having a plurality of glass optical fibers centrally disposed therein. A protective tubular structure known as a buffer tube surrounds the fragile glass fibers and a protective wrap encompasses the buffer tube. Still further, a shield and outer jacket complete the outer radial layers of a typical one of the cables. Thus, different ones of these various layers are exposed on an incoming fiber optic cable extending through the end plates and into the first cavity 38 defined by the splice area of the tray organizer C.

Figure 3:
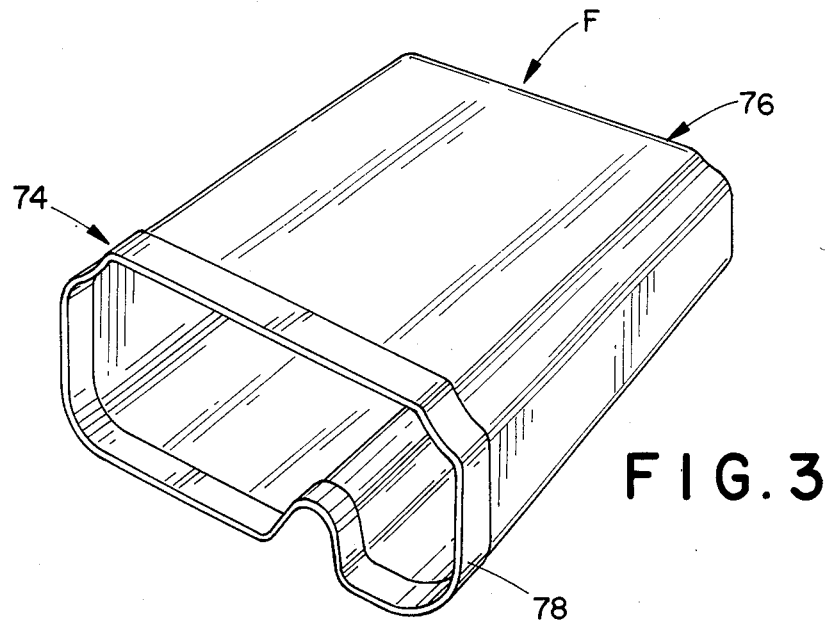
FIG. 3 is an enlarged perspective view of the resin cup used in the FIG. 1 closure assembly.

The subject invention includes means for retaining a limited amount of encapsulant to sealant material at an appropriate or critical area to limit the axial ingress of moisture into the first cavity 38. Although other arrangements may be satisfactorily used, the retaining means preferably includes a resin mold or cup F. A first embodiment of the resin cup is illustrated in FIGS. 1 and 3, and has a first or open end 74 and a second, generally closed end 76. An enlarged lip portion 78 is adapted for abutting engagement with the inner face 14 of an associated end plate. The lip portion has been found useful to enable a sealant collar (not shown) to be applied to the cup if desired. The sealant collar enhances development of a seal between the resin cup and end plate without additional manipulation as the cup is pressed into place. The open end 74 has a dimension that easily accommodates the buffer tubes. Further, the generally closed end 76 includes plural apertures 80 designed to closely receive associated buffer tubes therethrough. Additionally, openings 82 receive grounding means formed of a conductive material as will be described in greater detail below.

Figure 2:
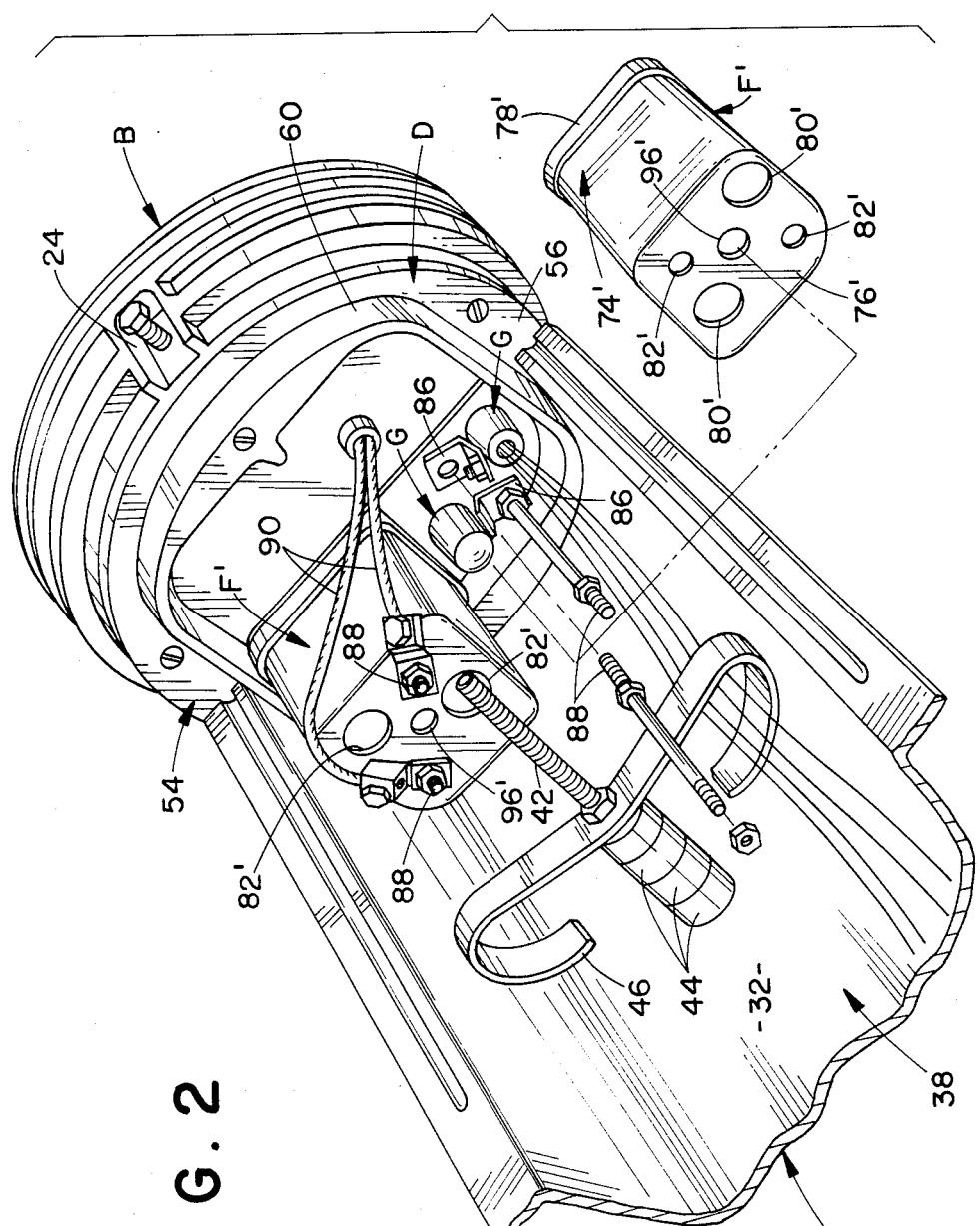
FIG. 2 is an enlarged, detailed perspective view of an alternate resin cup arrangement received in the closure assembly of the subject invention.

An alternate configuration of the resin cup is shown in FIG. 2. For ease of illustration, like elements of the alternate resin cup F' are identified by like numerals with a primed (') suffix and new elements are identified by new numerals. The shield portion of the fiber optic cable G is exposed and an angle bracket 86 is secured to the end plate through use of grounding stud bracket 88. As illustrated, the shield of the fiber optic cable is preferably folded back for electrical connection with the angle bracket. The stud bracket extends axially from the angle bracket completely through the resin cup F' and exits the generally closed end 76' of the cup through opening 82'. Grounding wires 90' cooperate witht the inner end of the stud brackets to complete the electrical grounding of the fiber optic cable.

A fill port 96' is also provided in the second end 76' of the resin cup. According to the subject invention, the buffer tubes are received through the end plate and electrically grounded through use of the stud bracket, angle bracket, and grounding wires as described above. The stud bracket assist in maintaining the open end 78' of the resin cup in abutting engagement with the end plate. Thereafter, a limited amount of encapsulant material such as a hard or soft resin, and hereinafter referred to as a first resin, is provided to the interior cavity of the resin cup. The cup maintains the resin around the cable while it sets. Once the resin has set, the first resin defines a means for limiting moisture ingress axially into the first cavity. With use of the resin cup, only a limited area of the first cavity 38 receives any resin, i.e., only in the resin cup. The major portion of the first cavity is free of any resinous material so that the slice region of the fiber optic cables remains open and clear of any resin. Thus, a relatively permanent barrier to axial ingress of moisture to the first cavity is established by the first resin. Of course, other resin cup arrangements can be utilized with equal success.

Once the resin cup has been secured in place and the first resin set, the inner shell assembly E seals the first cavity 38. More particularly, cooperating inner shell portions 100, 102 engage the spaced adaptor collars along the mounting surfaces 62. The first shell 100 portion includes extending side flanges 104, 106 that abuttingly engage flange portions 108, 110, respectively, extending from the second shell portion 102. Fastening means 116 such as the individual clips illustrated in FIG. 1 or, alternatively, a single elongated clip fastener (FIG. 5) secures the flanges of the inner shell portions together. The tray organizer C is secured to the shell portion in a conventional, known manner.

Figure 5:
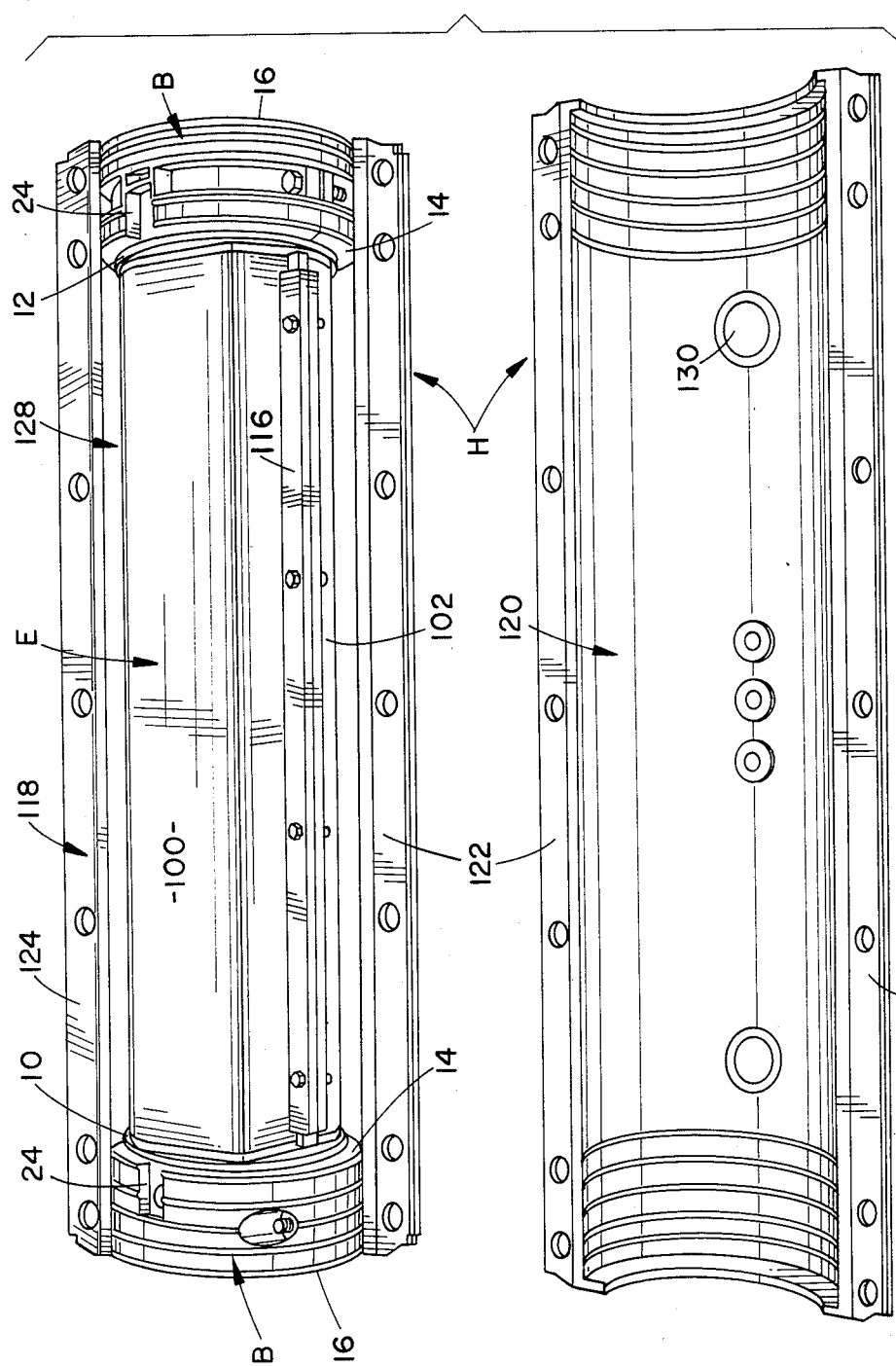

The preferred embodiment also includes an outer shell assembly H that extends around the end plates 10, 12 (FIG. 5). The first and second outer shell portions 118, 120 matingly engage one another along respective flange portions 122, 124. These flange portions may be secured through use of conventional fastening means (not shown). Preferably, the outer shell portions are formed of stainless steel and define an annular second cavity 128 between the inner and outer shell assemblies. The second cavity 128 is adapated to receive a reenterable encapsulant material or second resin through fill port 130. Thus, the inner shell assembly E provides a first protective layer for the first cavity 38. Extra protection is provided by the reenterable second resin and, lastly, the outer shell assembly H. The outer shell assembly, resin, and inner shell assembly all contribute to limiting radial moisture ingress to the first cavity 38.

A reenterable resin is used to fill the second cavity 128 in case there is a need to access the cavity 38 for further splicing. The reenterable resin is designed to be easily torn away so that the first cavity can be reentered without too much difficulty. On the other hand, the reenterable resin is durable enough to limit radial ingress of moisture for an extended period of time.

According to the preferred method of the invention for encapsulating the fiber optic cable, the end plates each receive an adaptor collar. The tray organizer is positioned between the end plates and at least one resin cup positoned adjacent an end plate to receive the fiber optic cable as it extends inwardly into the first cavity. The resin cup is filled with a first resin so that axial ingress of moisture is inhibited. Since the resin cup is substantially smaller than the cavity defined between the end plates, only a minor portion of the cavity is utilized for moisture protection. The remainder or major portion of the cavity is open and the cable is spliced therein. Next, the cover E is positioned on the adaptor collars.

The second, outer shell assembly is arranged in generally concentric covering relation with cover E. The annular second cavity defined between the cover and outer shell assembly is thereafter filled with a reenterable second resin. Thus, a completed closure assembly limits both axial and radial ingress of moisture to the first cavity.

If desired, the outer shell assembly is removed, the reenterable resin taken out, and entry gained to the first cavity through removal of the inner shell assembly. Once any repair or further splicing has been completed, the inner shell assembly is again secured to the adaptor collar, the outer shell assembly positioned therearound, and the second cavity, once again, filled with a reenterable resin.

The invention has been described with reference to the preferred embodiment. Obviously modifications and alterations will occur to others upon a reading and understanding of this specification. It is intended to include all such modifications and alterations insofar as they come within the scope of the appended claims or the equivalents thereof.

Having thus described the invention, it is now claimed:

1. A closure assembly adapted for encapsulating an associated fiber optic cable, the closure assembly comprising:
   first and second opposed end plates disposed in laterally spaced apart relation and defining a cavity therebetween, said first end plate having an opening therethrough adapted to closely receive an associated cable into said cavity;
   a cover extending between said first and second end plates for enclosing said cavity; and,
   a resin cup having a first open end engaging said first end plate and a second generally closed end having an aperture adapted to closely receive the associated cable therethrough, said rein cup further including a fill port spaced from said aperture for receiving said resin therein whereby ingress of moisture to the central cavity is limited.

2. The closure assembly as defined in claim 1 wherein said cup further includes a lip disposed along a peripheral portion of said first end.

3. The closure assembly as defined in claim 1 further comprising an adaptor member operatively engaging said first end plate, said adaptor member engaging said cover along a peripheral portion thereof.

4. The closure assembly as defined in claim 1 further comprising a first resin for limiting axial ingress of moisture to said cavity.

5. The closure assembly as defined in claim 4 further comprising a reenterable second resin for limiting radial ingress of moisture to said cavity.

6. The closure assembly as defined in claim 1 wherein said cover includes first and second inner shells adapted to sealingly enclose said cavity.

7. The closure assembly as defined in claim 1 further comprising an outer shell generally concentrically received around said cover.

8. The closure assembly as defined in claim 7 wherein said outer shell includes first and second outer shell portions.

9. The closure assembly as defined in claim 1 further comprising an adaptor collar having a first surface operatively engaging said first end plate and a second surface facing said cavity, said adaptor collar further including a peripheral portion for receiving said cover thereon.

10. A closure assembly adapted for sealing a fiber optic cable splice, said closure assembly comprising:
   first and second end plates axially spaced from one another and defining a first cavity therebetween, at least one of said end plates having an opening adapted to closely receive an associated cable therethrough;
   an inner shell extending between said end plates and adapted to cover said first cavity;
   a resin cup having a first end operatively engaging said first end plate and receiving the associated cable, a second end of the resin cup having an aperture closely receiving the associated cable, and a fill port disposed on said resin cup and spaced from said aperture for receiving a limited amount of first resin therein; and,
   means adapted for grounding the fiber optic cable, said grounding means extending through said resin cup to maintain electrical continuity with a shield of the fiber optic cable.

11. The closure assembly as defined in claim 10 further comprising first and second adaptor members disposed adjacent said end plates.

12. The closure assembly as defined in claim 10 further comprising an organizer tray disposed between said end plates.

13. The closure assembly as defined in claim 10 wherein said grounding means includes an elongated stud bracket having one end disposed adjacent said end plate opening and a second end extending through the second end of said resin cup.

14. The closure assembly as defined in claim 10 further comprising an outer shell extending between said end plates and disposed around said inner shell in laterally spaced relation thereto to define a second cavity.

15. The closure assembly as defined in claim 14 further comprising a reenterable resin received in said second cavity for limiting radial ingress of moisture to said first cavity.

16. The closure assembly as defined in claim 14 wherein said inner and outer shells each include first and second separate shell portions.

* * * * *